July 25, 1944.  A. M. STONER  2,354,226
KEYLESS CHUCK
Filed June 26, 1942  2 Sheets-Sheet 1
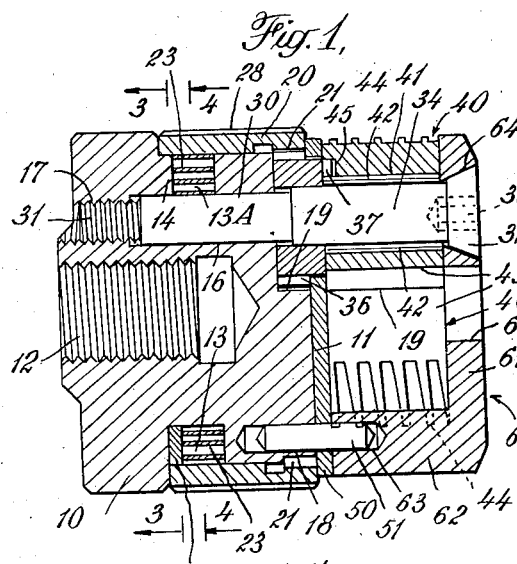
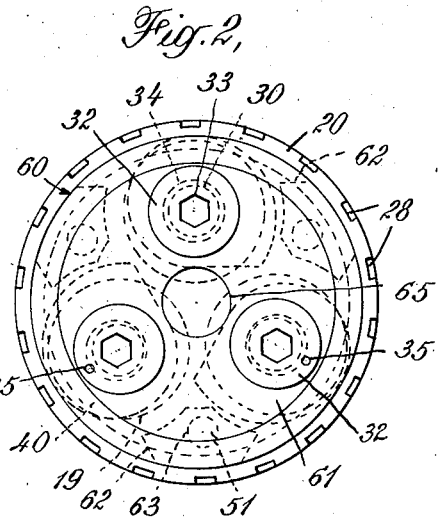
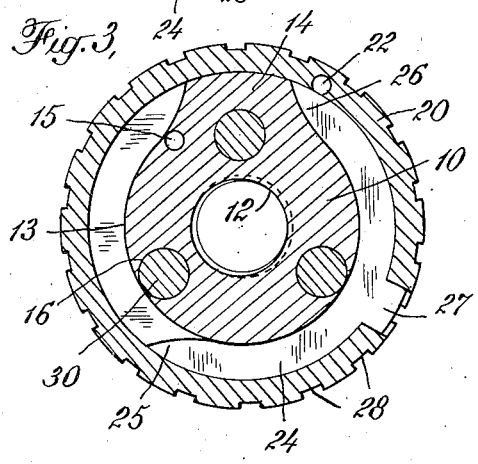
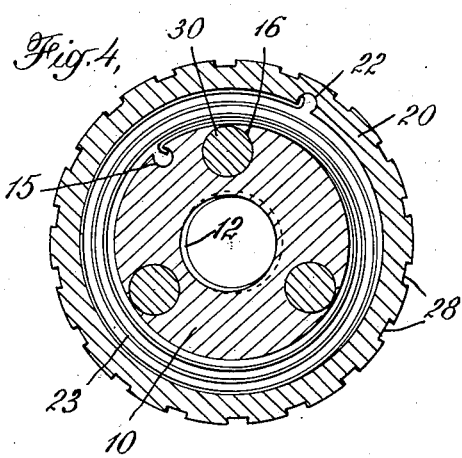
INVENTOR.
Arthur Merrick Stoner
BY E. W. Marshall
ATTORNEY

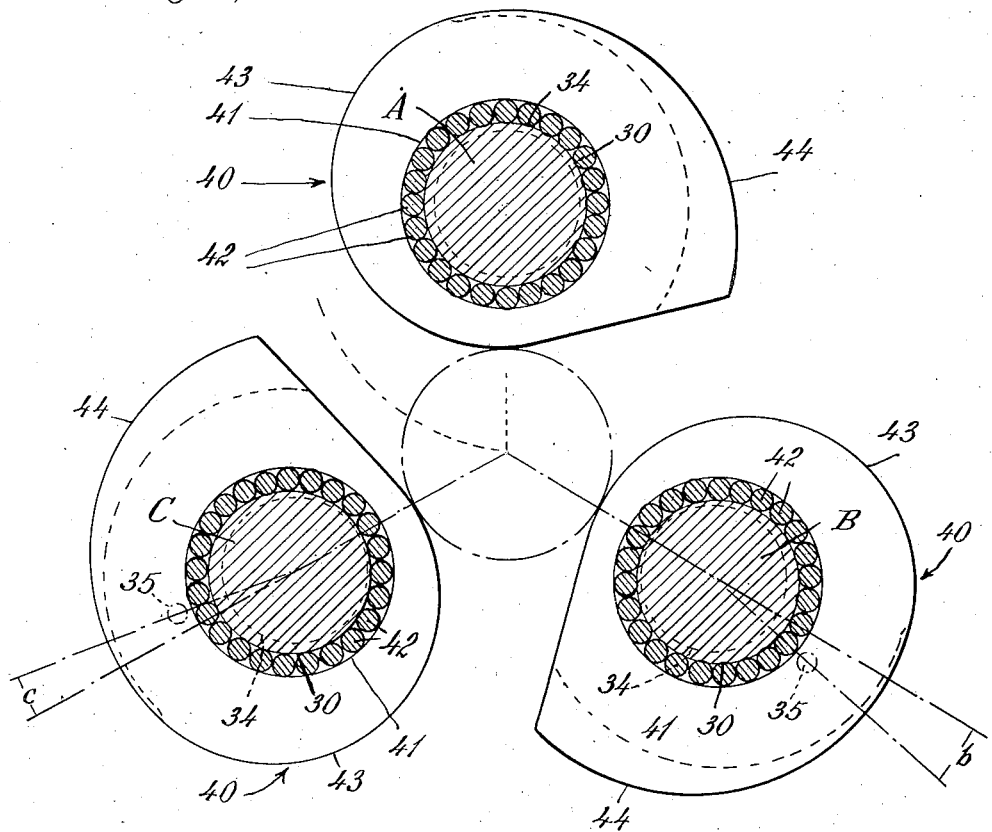

Patented July 25, 1944

2,354,226

UNITED STATES PATENT OFFICE 2,354,226

KEYLESS CHUCK

Arthur Merrick Stoner, West Hartford, Conn., assignor to The Jacobs Manufacturing Company, Hartford, Conn., a corporation of Connecticut Application June 26, 1942, Serial No. 448,558

6 Claims. (Cl. 279—33)

This invention relates to keyless chucks, and especially to chucks of the type shown in United States Patent 2,207,230, issued to me July 9, 1940, and its object is to provide improvements over the chuck shown in that patent. In Patent 2,207,230, I showed that simultaneously rotatable eccentric clamping jaws of a chuck may be micrometrically adjusted in relation to the axis of the chuck by mounting them upon angularly adjustable posts which have portions about which the jaws rotate, which portions are eccentric to the axis of the mounting of the posts; together with means for locking the posts in their adjusted positions. I have discovered that the advantage of the invention disclosed in the aforesaid patent may be attained in the novel manner disclosed herein, in which the posts upon which the jaws are rotatably mounted are used to hold the parts of the chuck together, and such of the posts as may have eccentric portions are held in the desired angular relation to the axis of the chuck by the act of assembling the parts. This and other objects of the invention will be fully described in the following description and the novel features of the invention which will be set forth in the appended claims.

Referring to the drawings,

Fig. 1 is a sectional side elevation of a preferred form of chuck which is made according to and embodies the invention;

Fig. 2 is a front elevation of the chuck shown in Fig. 1;

Figs. 3 and 4 are sectional end elevations of the chuck shown in the preceding figures, the sections being taken respectively on the lines 3—3 and 4—4 of Fig. 1;

Fig. 5 is an enlarged front elevation of the clamping jaws, with the eccentric portions of the posts upon which they are mounted shown in section.

10 designates the substantially cylindrical body of the chuck having a flat transverse face 11. 12 is an internally threaded axial bore in the rear end of the body which is adapted to fit an externally threaded spindle of a machine tool, such as a power drill. 13 is an annular groove in the body intermediate its ends. From Figs. 1 and 3 it may be seen that the front side of this groove is a flat surface, but that the rear wall has an inwardly extending portion which forms an abutment member 14 which makes a small part 13A of the groove narrower than the rest of it. The purpose of this construction will be explained hereinafter. 15 is a hole drilled in the body in a direction parallel with the axis of the body and in such a position that it intersects the base of the groove.

Three post holes 16 are drilled into the body from its outer face. These are equally spaced angularly and are at an equal distance from the axis of the body and parallel therewith. The inner end portions of these post holes are provided with internal screw threads 17. Between the post holes are three equally spaced dowel holes 18. Three circular pockets 19, concentric with the post holes 16, are countersunk below the face 11 of the body.

20 designates a hollow cylindrical sleeve rotatively supported on the body. The sleeve overlies the groove 13 and extends to the face 11 of the body. At its forward end it has an annular ring of gear teeth 21 and these teeth extend into the pockets 19. A hole 22 is bored into the rear end of the sleeve parallel with its axis and intersecting its inner surface. One end of a flat spiral spring 23 is hooked into the hole 22. The spring lies in the groove 13, and its other end is hooked into the hole 15 in the body. This arrangement is such as to cause the sleeve 20 to rotate on body 10 in an anti-clockwise direction, as viewed from the front end of the chuck, (Figs. 2 and 4).

The relative movement of the sleeve on the body is limited by a stop member 24 (Fig. 3) which lies in the groove 13 on the rear surface of the wider part of the groove. The thickness of the stop member is preferably the same as that of the abutment 14, (see Fig. 1). It has two prongs or forks 25, 26 which engage the abutment 14 and midway between them is an outwardly projecting lug 27 which extends into a slot cut in the end of the sleeve. The sleeve may be rotated in the opposite direction against the action of the spring by hand, by the operator grasping its outer surface which is fluted, as shown at 28, to facilitate such operation.

Posts having cylindrical portions 30 are fitted into the holes 16. The inner end portions of these posts are threaded, as shown at 31, to fit the threads 17. Conical heads 32 are formed on the outer end of the posts in axial alinement with the parts 30 thereof. 33 designates hexagonal wrench sockets for rotating the posts.

Intermediate the portions 30 and the heads 32 of the posts are cylindrical parts 34 upon which the clamping jaws are rotatably mounted. The parts 34 of one or more of the posts may be slightly eccentric to the portions 30 and the heads 32. The heads of the posts having eccentric parts 34 may be marked, as at 35, to indicate the maximum point of eccentricity.

Pinions 36, seated in the pockets 19, are rotatively supported on the intermediate parts 34 of the posts. These engage and are driven by the teeth 21 of sleeve 20.

40 designates the clamping jaws. These have cylindrical bores 41 which surround the intermediate portions of the posts with interposed rollers 42. Each jaw has a body with an eccentric portion 43 and with spaced eccentric ribs 44 which are preferably cut spirally, as shown in Patent No. 2,207,238, issued to Charles Edward Clark, July 9, 1940. A socket 45 is formed in the rear end of each clamping jaw and a lug 37 projects from the hub of the adjacent pinion into this socket so that the rotation of the pinions is transmitted to the clamping jaws.

50 designates a cover plate which is provided with clearance holes for the hubs of the pinions 36 and for dowel pins 51. The cover plate lies on the face 11 of the body and extends over the front end of the sleeve 20 to retain it on the body.

60 is a nose piece in the form of a flat plate 61 with legs 62 projecting inwardly therefrom to the cover plate 50. 63 are dowel holes in the legs. The dowel pins 51 are placed in these holes and in the dowel holes 18 in the body to insure the proper angular alinement of the body and the nose piece. 64 designates conical openings in the plate 61 to receive the heads 32 of the posts. There is also a central bore 65 in the plate to clear a tool or other object to be held in the chuck. When the parts are assembled the clamping jaws 40 lie between the inner surface of the plate 61 and the cover plate 50. The rollers lie between the inner surface of plate 61 and the hubs of pinions 36 and inside the projecting lugs 37a.

It is difficult to machine the parts with sufficient accuracy to insure the positioning of the clamping jaws being such as to hold a tool or other object in exact axial alinement with the axis of the shaft. In Patent No. 2,207,230, I showed a mounting for the clamping jaws which can be micrometrically adjusted to overcome this difficulty. I have discovered that the desired result may be attained by the simplified construction shown and described herein. According to the present invention the supports for the clamping jaws consist of a body having a transverse flat face, a nose piece comprising a plate spaced from the face of the body by inwardly projecting legs and posts having concentric portions seated in the body, heads concentric with such seated portions, which heads engage the plate of the nose piece and threaded ends which are screwed into the body with parts intermediate the seated portions and the heads, upon which parts the clamping jaws are rotatably mounted. Any one or more of these intermediate parts may be eccentric to the threads and heads of its respective post.

In assembling the parts, posts having concentric parts 34, such as shown at A in Fig. 5 are used. It may be found that one or more of the jaws need a slight adjustment toward or away from the axis of rotation of the chuck. In such case, posts which have eccentric bearing portions are substittued. For example, the post shown at B in Fig. 5 may, when screwed up tight, have its point of eccentricity at an angle $b$ from a radius through the axes of the chuck and of the concentric part of the post, in order to position its clamping jaw at the exact distance required from the axis of the chuck.

Similarly, the post shown at C in Fig. 5 may, when screwed up tight, have its point of eccentricity at an angle $c$ from a radius through the axes of the chuck and of the concentric part of the post, in order to position its clamping jaw at the exact distance required from the axis of the chuck. In this simple manner the supports for the clamping jaws may be positioned with the greatest nicety.

The length of the legs 62 of the nose piece is important as it determines the exact distance between the plate 61 and the threads 17 and permits the posts upon which the clamping jaws are mounted to hold the nose piece, the cover plate and the body 10 together under considerable pressure without creating any longitudinal pressure upon the sleeve 20, the pinions 36, the clamping jaws 40 or the rollers 42, so that all of these parts may rotate freely.

What I claim is:

1. A chuck comprising a rotatable body, a nose piece having a transverse plate, angularly spaced legs projecting from said transverse plate arranged to space said plate from the body, posts having heads engaging the plate and screwed into spaced threaded holes formed in the body parallel to the axis thereof to secure the nose piece to the body, said posts having parts intermediate their heads and the portions thereof in the holes in the body, eccentric clamping jaws between the body and the plate of the nose piece rotatably mounted on said intermediate parts of the posts, the intermediate part of at least one of the posts being eccentric to the part thereof in the hole in the body, a sleeve rotatably supported by the body, and means for causing the rotation of the sleeve on the body to impart a simultaneous rotation of the clamping jaws on said posts.

2. A chuck comprising a rotatable body, a nose piece having a transverse plate, angularly spaced legs projecting from said transverse plate arranged to space said plate from the body, posts having heads engaging the plate and screwed into spaced threaded holes formed in the body parallel to the axis thereof to secure the nose piece to the body, said posts having parts intermediate their heads and the portions thereof in the holes in the body, eccentric clamping jaws between the body and the plate of the nose piece rotatably mounted on said intermediate parts of the posts, the intermediate part of at least one of the posts being eccentric to the part thereof in the hole in the body, a sleeve rotatably supported by the body, and means for causing the rotation of the sleeve on the body to impart a simultaneous rotation of the clamping jaws on said posts, the length of said posts being so proportioned in relation to said legs that when screwed up tight the axes of the intermediate parts of the posts will be brought into desired distances from the axis of rotation of the body.

3. A chuck comprising a rotatable body having a reduced cylindrical portion and a transverse face, a cover plate seated upon said face and extending over said reduced portion of the body, a nose piece having a transverse plate and angularly spaced legs projecting from said transverse plate to the cover plate, posts having heads engaging the transverse plate of the nose piece, passing through the cover plate and screwed into spaced threaded holes formed in the body parallel to the axis thereof to secure the nose piece and the cover plate to the body, said posts having parts intermediate their heads and the portions thereof in the holes in the body, eccentric clamping jaws between the transverse plate of the nose piece and the cover plate rotatably mounted on said intermediate parts of the posts, the intermediate part of at least one of the posts being eccentric to the part thereof in the hole in the body, a sleeve rotatably supported by the body back of the cover plate, and means for causing the rotation of the sleeve on the body to impart a simultaneous rotation of the clamping jaws on said posts.

4. A chuck comprising a rotatable body having a reduced cylindrical portion and a transverse face, a cover plate upon said face extending over said reduced portion of the body, a nose piece having a transverse plate and angularly spaced legs projecting from said transverse plate to the cover plate, posts having heads engaging the transverse plate of the nose piece, passing through the cover plate and screwed into spaced threaded holes formed in the body parallel to the axis thereof to secure the nose piece and the cover plate to the body, said posts having parts intermediate their heads and the portions thereof in the holes in the body, eccentric clamping jaws between the transverse plate of the nose piece and the cover plate rotatably mounted upon said intermediate parts of the posts, a sleeve rotatably supported by the body back of the cover plate, means for causing the rotation of the sleeve on the body to impart a simultaneous rotation of the clamping jaws on said posts, a spring arranged to rotate the sleeve in relation to the body in a direction to move the clamping jaws toward their gripping positions, and means for limiting the rotative movement of the sleeve in relation to the body.

5. A chuck comprising a rotatable body, a nose piece having a transverse plate, means for spacing said plate from the body, posts having heads engaging the plate and screwed into spaced threaded holes formed in the body parallel to the axis thereof to secure the nose piece to the body, said posts having parts intermediate their heads and the portions thereof in the holes in the body, eccentric clamping jaws between the body and the plate of the nose piece rotatably mounted on said intermediate parts of the posts, the intermediate part of at least one of the posts being eccentric to the part thereof in the hole in the body, a sleeve rotatably supported by the body, means for causing the rotation of the sleeve on the body to impart a simultaneous rotation of the clamping jaws on said posts, a spring arranged to rotate the sleeve in relation to the body in a direction to move the clamping jaws toward their gripping positions, and means for limiting the rotative movement of the sleeve in relation to the body, said means comprising a transverse stop member positively engaging the sleeve, said member having spaced prongs, and an abutment projecting from the body between said prongs in the plane of said stop member.

6. A chuck comprising a rotatable body having a reduced cylindrical portion and a transverse face, a cover plate upon said face extending over said reduced portion of the body, a nose piece having a transverse plate and angularly spaced legs projecting from said transverse plate to the cover plate, posts having heads engaging the transverse plate of the nose piece, passing through the cover plate and screwed into spaced threaded holes formed in the body parallel to the axis thereof to secure the nose piece and the cover plate to the body, said posts having parts intermediate their heads and the portions thereof in the holes in the body, eccentric clamping jaws between the transverse plate of the nose piece and the cover plate rotatably mounted upon said intermediate parts of the posts, a sleeve rotatably supported by the body back of the cover plate, means for causing the rotation of the sleeve on the body to impart a simultaneous rotation of the clamping jaws on said posts, a spring arranged to rotate the sleeve in relation to the body in a direction to move the clamping jaws toward their gripping positions, and means for limiting the rotative movement of the sleeve in relation to the body, said means comprising a transverse stop member positively engaging the sleeve, said member having spaced prongs, and an abutment projecting from the body between said prongs in the plane of said stop member.

ARTHUR MERRICK STONER.